Nov. 21, 1950     B. D. SMITH     2,531,005
VENTING PLUG FOR WELDING RODS
Filed Dec. 12, 1949
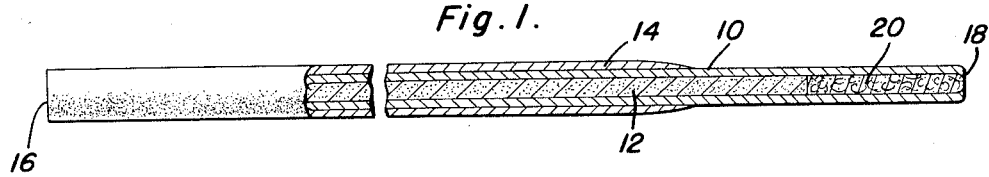
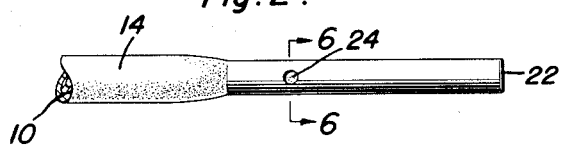     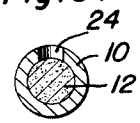
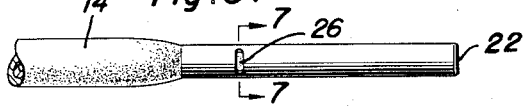     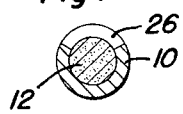
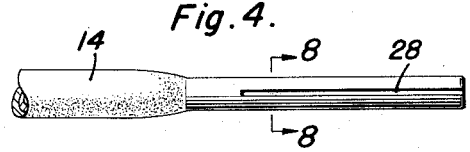     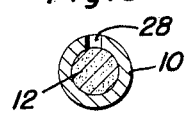
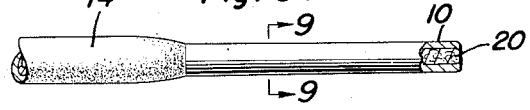     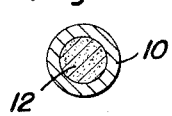
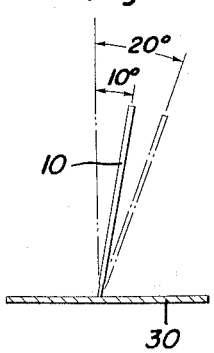     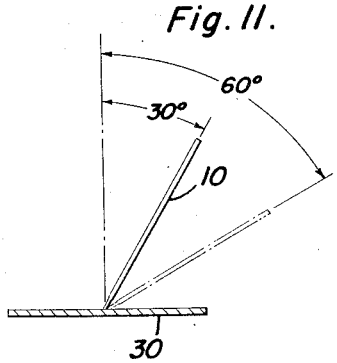
Belmont D. Smith
INVENTOR.
BY *Clarence A. O'Brien*
*and Harvey B. Jacobson*
Attorneys Patented Nov. 21, 1950

2,531,005

UNITED STATES PATENT OFFICE 2,531,005

VENTING PLUG FOR WELDING RODS

Belmont D. Smith, Eaton, Ohio

Application December 12, 1949, Serial No. 132,453

5 Claims. (Cl. 219—8)

This invention relates to a hollow metallic rod designed to retain granular alloying fillers for use in oxy-acetylene or electric welding, the primary object of which is to provide a means for venting heated gases from the hollow rod to prevent pressure from building up within the hollow rod causing holes to form therein through which the granular filler material will be lost.

In order to obtain the proper type of weld, either with an oxy-acetylene torch or an electric arc, the applicant has provided a hollow metallic tube which may be either circular, square or oblong in shape and which may be fabricated of iron, steel, or other suitable welding metal. The tube is closed at one end and is filled with a granular alloying filler which is preferably boron, molybdenum or tungsten carbide. In fact, it has been found that when the other end of the tube is sealed and the rod is heated during the welding process, the gases within the tube expand and create an internal pressure which eventually produces holes within the tube with the result that the filler material spills out of these holes. To avoid this, the applicant has provided a porous venting plug at the open end of the tube. It is accordingly an important object of this invention to eliminate losses of the alloying fillers or carbides from the hollow welding rod.

When the hollow welding rod and porous plug including the filler is employed with an oxy-acetylene torch or electric arc method of welding, the iron hollow rod melts and forms a matrix to hold the carbide particles in the weld. With lower melting filler alloys, the filler material melts along with the rod making a weld which is itself an alloy having the desired analytical characteristics. Accordingly, it is another important feature of this invention to provide a welding rod which may be employed both with an oxy-acetylene torch and with an electric arc to rapidly produce a weld which will either have the desired alloying characteristics or will be in the form of a matrix retaining carbide particles of great hardness.

Yet another object of this invention is to provide a device of the character described which is relatively simple in design and construction, easy to assemble for use, cheap to manufacture in large quantities, and very efficient for its intended purpose.

These, together with various ancillary objects and features of the invention which will later become apparent as the following description proceeds, are attained by the device, a preferred embodiment of which has been illustrated by way of example only in the accompanying drawings, wherein:

Figure 1 is a longitudinal sectional view through the hollow rod shown assembled with one form of a venting plug;

Figure 2 is a fragmentary side elevational view of the hollow rod shown associated with another form of a venting plug;

Figure 3 is a view similar to that shown in Figure 2 illustrating still another form of a venting plug;

Figure 4 is a view similar to Figure 2 illustrating yet another form of a venting plug;

Figure 5 is a fragmentary side elevational view of the device shown in Figure 1, parts being broken away to show details of construction;

Figure 6 is a sectional view taken substantially on the plane of section line 6—6 of Figure 2;

Figure 7 is a sectional view taken substantially on the plane of section line 7—7 of Figure 3;

Figure 8 is a sectional view taken substantially on the plane of section line 8—8 of Figure 4;

Figure 9 is a sectional view taken substantially on the plane of section line 9—9 of Figure 5;

Figure 10 is a diagrammatic view of the manner of employing the hollow welding rod in electric arc welding; and Figure 11 is a diagrammatic view of the manner of employing the hollow welding rod when using an oxy-acetylene torch.

Specific reference is now made to the drawings. In the several views in the accompanying drawings and in the following specification similar reference characters indicate corresponding elements throughout.

Indicated generally at 10 is a hollow rod which may either be circular, square or oblong in cross section. This rod may be fabricated of iron, steel, or any other suitable welding alloys and is adapted to receive a filler material 12 which is preferably granular and may be either boron, molybedenum or tungsten carbide, steel, cast iron or other alloying material to make a weld deposit of desired analytical characteristics. The hollow rod 10 may be coated as at 14 with a mineral material or flux to assist in the production of the weld. The hollow rod is closed at one end as at 16 and open at the opposite end as at 18.

To prevent the production of pressure in the hollow tube due to heated air, a venting plug is provided and is maintained at the open end 18 of the hollow rod as will be described hereinafter.

In the modification shown in Figures 1, 5 and 9, the venting plug consists of a batting of wool or cotton 20 which is porous so that gases will be vented therethrough, the batting serving to properly retain the filler material 12 within the hollow rod 10.

In the modification shown in Figures 2 and 6, the plug consists of a closure 22 at the normally open end 18 of the hollow rod. The portion of the hollow rod 10 adjacent the closure 22 is provided with a radially extending bore or aperture 24 which will serve to vent the heated gases within the hollow tube. Inasmuch as the filler material 12 will be retained in the hollow tube within an inch or so of the open end 18 or the closure 22, the portion of the tube 10 adjacent the closure 22 and which has the venting aperture 24 will not contain any filler material.

In the modification shown in Figures 3 and 7, the same construction as employed in the modification shown in Figures 2 and 6 is provided except that the venting means is an arcuate transversely extending slot 26.

In the modification shown in Figures 4 and 8, the plug is in effect the unfilled portion of one end of the hollow tube 10 and is provided with a venting means which consists of a longitudinally extending slit 28.

When employing the present device as an electrode in electric arc welding for producing a weld on a base material 30, the rod is usually held at an angle from 10° to 20° from the vertical position. When the tube is to be employed with an oxyacetylene torch, it is held at an angle from 40° to 60° from the vertical position. It will also be understood that solid rods or bars of desired filler materials may be positioned within the hollow tubes 10 instead of granular material when it is desired to obtain a weld having characteristics which cannot be obtained with granular carbide materials.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In combination with a hollow welding rod containing an alloying filler and closed at one end, a coating of welding flux on the outer surface of said rod and a plug carried at the open end of said rod, said plug including means for venting gases from said rod when the latter is heated.

2. The combination of claim 1 wherein said plug is a wad of porous material removably retained in the open end of said rod.

3. The combination of claim 1 wherein said plug includes a closure at the open end of said rod, said venting means including a radially extending bore in said rod adjacent said closure.

4. The combination of claim 1 wherein said plug includes a closure at the open end of said rod, said venting means including a longitudinal slit in said rod adjacent said closure.

5. The combination of claim 1 wherein said plug includes a closure at the open end of said rod, said venting means including an arcuate transverse slit in said rod adjacent said closure.

BELMONT D. SMITH.

REFERENCES CITED

The following references are of record in the file of this patent:

UNITED STATES PATENTS

| Number | Name | Date |
|---|---|---|
| 2,442,087 | Kennedy | May 25, 1948 |

FOREIGN PATENTS

| Number | Country | Date |
|---|---|---|
| 473,532 | Great Britain | Oct. 14, 1937 |
| 513,045 | Great Britain | Dec. 20, 1937 |